Feb. 5, 1929.
L. O. GLATZNER
1,701,205
ILLUMINATED DISPLAY
Filed Oct. 17, 1927
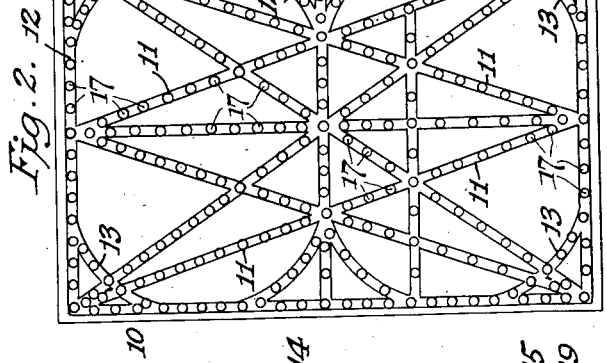
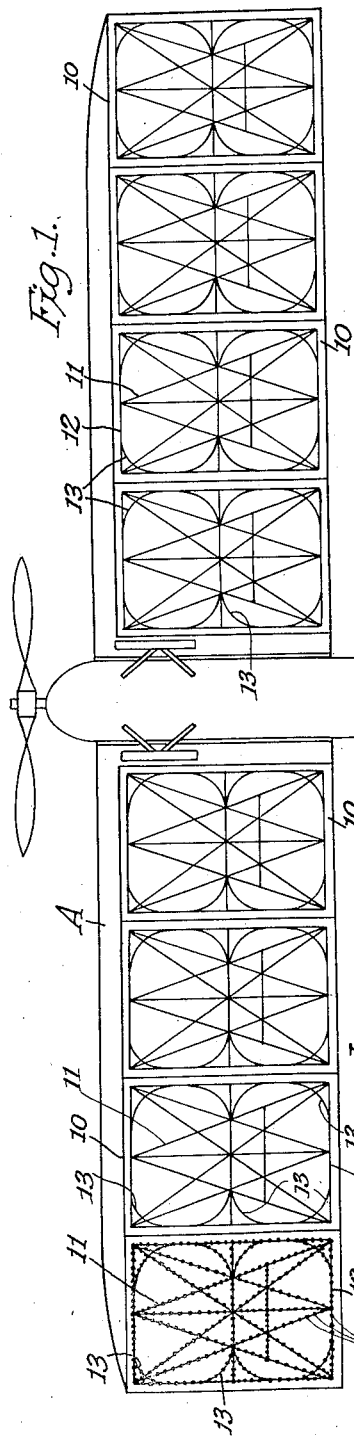
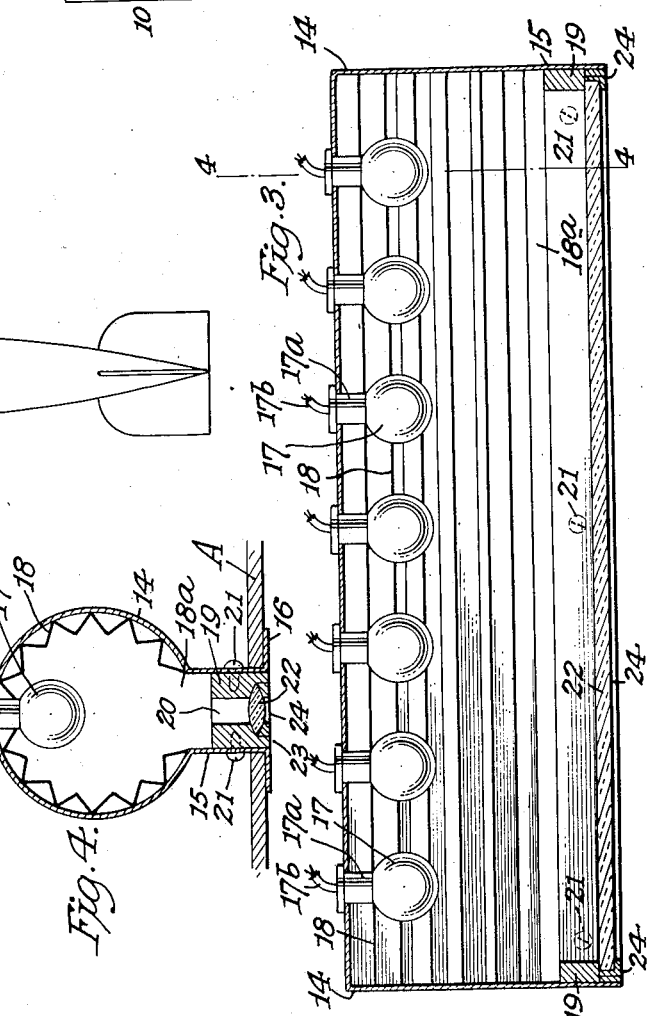
INVENTOR
Louis O. Glatzner
BY
ATTORNEY Patented Feb. 5, 1929.

1,701,205

UNITED STATES PATENT OFFICE.

LOUIS O. GLATZNER, OF BRISTOL, PENNSYLVANIA.

ILLUMINATED DISPLAY.

Application filed October 17, 1927. Serial No. 226,562.

My invention is an illuminated display, including an illuminated indicating and signal mechanism for aircraft communication, for advertising purposes, and for a variety of other display purposes.

It is not desired or intended to confine the invention for use in the arts of aircraft signalling and communication, for the reason that said invention possesses pronounced utility in the arts pertaining to advertising and to display purposes generally, hence, it is to be understood that my invention is broadly for any and all fields of utility where electrical illumination is desirable, particularly in such utilities as require distant visibility with an economical utilizaton of electrical current for such purposes.

The objects of the invention are, first, to attain distant visibility with certainty, and, second, to effect economy in the consumption of electrical energy utilized for the illumination.

In the arts pertaining to signalling from a moving air craft, and for display purposes, it is required that a character, symbol or letter be illuminated to render the same visible in the darkness, and in some instances in the daylight, in order to attain such a display as to be readable with clearness and certainty. This function is especially useful when considerable distances intervene between the observer and the illuminated display, and, moreover, clear visibility is demanded when the apparatus is moving with an air craft in rapid flight.

My invention is embodied in one practical form of apparatus as a letter, character or symbol, hereinafter referred to as a character, associated with illuminating means, and with means whereby beams of light are projected to attain distant visibility.

In my invention, the light rays emanating from the illuminating means are concentrated and projected, to which ends there are employed reflectors and lenses coacting to project beams of light through relatively restricted light outlets.

Illumination is afforded by incandescent lamps energized by electric current from a source of supply, and such lamps with the reflectors and the lenses are so related to the components of the character that the outlines of such character are rendered visible over great distances.

In one form of apparatus, the components of the character are of channeled formation and are provided with restricted light openings. A plurality of lamps are housed within the channeled components of the character, it being preferred to associate reflectors and lenses with such lamps to attain maximum visibility of said character over extreme distances. The beams of light from the components of the character are projected on relatively thin lines easily distinguishable by the eye, and such light beams are of relatively great intensity, to the end that there is a minimum dispersion of the light rays, the effect of which is to preclude the merging of the beams of light from the apertured components of the character, and attaining efficiency in the service of the apparatus, for the reason that the light beams from one apertured component of the character do not merge into or blend with the light beams from other components of the same character or of different character, with the ultimate effect of clear and distinct visibility over great distances.

For aircraft signalling and communication, the apparatus is designed to be embedded, countersunk, or otherwise associated with the wings or flying surfaces in a way to avoid obstruction to the functions of such aircraft. Again, the illuminated apparatus is in the form of a changeable sign controllable to afford communication between the aircraft and the ground or with a land station.

In my invention, the light rays are concentrated and projected to utilize the full illuminating power of the lamps, and such utilization of the light rays attains, also, a desirable economy in the consumption of the electrical current. Economy in the current required for illumination is desirable, particularly in aircraft signalling, for the reason that the weight and space demanded for the equipment is minimized. Moreover, economy in current consumption is highly desirable for illuminated signs employed for advertising purposes and for general display purposes, such as signs employed on high buildings, for the reason that signs ordinarily used are wasteful of current, due to the absence of adequate concentration and projection of the light rays.

Other functions and advantages of the invention will appear from the following description taken in connection with the drawings, wherein—

Figure 1 is a view showing one mode of using my invention as a communication means from an aircraft, a series of illuminated characters being provided on the flying surfaces.

Figure 2 is an enlarged view of a changeable letter illuminated in accordance with my invention.

Figure 3 is a vertical section through a component of the character, illustrating a series of lamps in association with a lens common to the lamps of the series.

Figure 4 is a vertical cross section through the structure of Figure 3 on the line 4—4, illustrating more clearly certain structural elements of the illuminated character.

In the drawings, the part or element heretofore referred to as a character, is shown in Figure 2 as a composite letter, 10, of the alphabet, the same being changeable at will by illuminating the components in a determined relation to produce to the eye of an observer the outlines of a single definite letter, such as the letter A, or B, or C, and so on through the alphabet. Generally speaking, such composite letters are well known in the art, and hence require no detailed explanation.

In my invention, the two or more components of the character 10, are, generally speaking, of channeled formation in order to constitute a definite outline of relatively narrow cross section, as depicted in Figures 1 and 2, but for clearness of illustration the cross section of one character is shown on an enlarged scale in Figures 3 and 4 of the drawings. Thus, the changeable letter is shown as comprising a multiplicity of components, 11, 12 and 13, some of which are straight and others curved, some being at right angles, and others being diagonally inclined, and all the various components being disposed in crossing or intersecting relation. It will be understood, however, that my invention is not limited nor confined to a changeable letter such as shown in Figures 1 and 2, for the reason that I may use any letter, character or symbol appropriate for the purpose to which the invention is applied; thus for an illuminated sign, single letters or characters may be used, and such letters assembled to produce a word. Various other arrangements of letters and characters will suggest themselves to those skilled in the art.

The components, 11, 12, 13, and each of the same, is of channeled formation, and of relatively narrow cross section as depicted in Figures 3 and 4, said channel being constituted by a light housing indicated generally by the numeral 14 in said Figures 3 and 4. As shown, said housing is of a length which exceeds the cross section, and said housing is of substantially circular form with a neck 15, the width of the latter being appreciably less than the diameter of the approximately circular part of the housing. The neck 15 extends lengthwise of the housing and projects substantially radially from it, and at its outer end this reduced neck is flanged at 16 to adapt it for contact with the element to which the housing is affixed, such as the wing plane A of an aircraft, the latter being indicated diagrammatically in Figure 1.

Within the housing 14 are positioned a series of lamps 17 and a reflector 18, said parts being mutually adapted one to the other for projecting a beam of light through the narrow outlet afforded by the neck 15. Obviously, any suitable lamp 17 may be employed for illuminating the letter component afforded by lamp housing 14, and, moreover, a suitable reflector, 18, is associated with the lamp or lamps for projecting the light beam. As shown, the component is illuminated by incandescent lamps positioned in series within the rounded section of the light housing, and spaced at suitable intervals, to afford the required volume of light; each incandescent lamp is shown as comprising a bulb with a reduced neck, $17^a$, seated in and passing through the lamp housing so as to accommodate the conductors, $17^b$, for the supply of electrical current to said lamp.

The reflector, 18, is within the rounded part of the lamp housing, in approximately enveloping relation to the lamp, but with an open space, $18^a$, in register with the narrow neck, 15, of the lamp housing. Said reflector is shown as extending lengthwise of the lamp housing, so that the reflector is a unit common to the plurality of lamps. The reflector is or may be of any desired form known to those skilled in the art, but for illustration it is shown as a multi-faced reflector, the faces of which are at an angle one to the other for collecting and reflecting the light rays emanating from the lamp. It will be understood that other forms of reflectors may be substituted for the multi-faced reflector shown, and that I reserve the right of using any form of reflector appropriate for the purpose.

In my invention, it is preferred to restrict the cross section of the light beam, and to project an intensified beam of light whereby its visibility is assured for a relatively great distance intervening the apparatus and the observer. To these ends, the path for the light beam flowing out of the casing is still further reduced by the provision of a reducing member shown as a plate, 19, with a relatively narrow light opening, 20. Said plate is positioned within the housing neck 15, and extends lengthwise thereof, the plate being fixedly attached by suitable means to the neck 15, such as the screws 21, whereby the plate is demountable from the lamp housing. The opening 20 is of less cross section than the housing, and it extends lengthwise of the reducing plate 19 in which said opening is formed.

For concentrating the light rays and projecting an intensified light beam, I provide a lens or lenses in the restricted outlet from the lamp housing constituting a component of the character 10. This lens or these lenses are of a form suitable for the purposes intended, and said lens or lenses are mounted in the lamp housing in the path of the light beam reflected from the lamp 17. As shown, a single lens, 22, of the desired cross section extends lengthwise of the lamp housing so as to be common to the series of lamps and to coact with the reflector, but, obviously, such structure may be modified by a skilled mechanic, at least to the extent of providing single lenses, one for each lamp, in a manner well understood by those skilled in the art. The lens is mounted in the reducing member 19 in a desirable manner. As shown, a recess, 23, is provided in the outer face of the member plate 19, in which recess the lens is positioned, and a retainer, or bezel, 24, is provided for marginal contact with said lens to hold it fixedly in position. As shown, the lens is convexo-convex in cross section, but other forms of lens may be used for concentrating and intensifying the light rays, the function of said lens being to concentrate and project the rays in the form of an intensified light beam of narrow cross section at its source of origin, whereby distinct visibility is assured.

In the service of the apparatus, the rays of light from the lamps within each housing constituting a component of the character are collected by the reflectors which collect the light rays emanating from the lamps and which reflect said rays in the form of a light beam flowing through the restricted openings, whereas the lenses 22 concentrate the rays of reflected light and project said beam of light, thus precluding dispersion of the light rays and sending out the light beam on definite lines to overcome a tendency of the light beams from different components to commingle one with the other. The concentration of the light rays by the conjoint action of the mirrors and the lenses, and the projection of the beam by the lenses, utilizes the maximum illumination afforded by the lamps and provides for the projection of the beams of light on definite lines and within relatively narrow limits, thus affording distinct illumination for each component of the character and attaining the desired distant visibility.

My invention may be utilized for advertising purposes, such as for illuminated street signs, and particularly for signs on high buildings, for the reason that said apparatus affords the required distant visibility with an economical current consumption. Again, the invention is useful on aircraft for signalling when in flight, and when embodied in composite letters of the kind shown in Figures 1 and 2, the apparatus affords means for communication from the craft in flight with a land station.

As shown in Figure 2, there is a multiplicity of elcetric lamps, in the character or letter, there being two or more lamps in each component of said character or letter. These lamps in the components are spaced or separated at appropriate intervals, to secure the effect on the eye of a close observer of a stencil with light beams from the lamps interspersed with blank spaces or non-illuminated areas. For distant visibility, however, the illuminations afforded by the individual lamps are blended, and such blended lights are concentrated into distinct beams which are projected over long distances, and thus afford the distinguishable illumination desired for signal purposes, advertising purposes, and light display.

Having thus fully described my invention, what I claim as new and desire to secure by Letters Patent is:

1. An illuminated apparatus for signal and display embodying a casing conforming to a character or symbol, said casing being of channeled cross section and provided with a light opening elongated and restricted both longitudinally and transversely of the length of the casing and conforming to a letter or symbol, illuminating means within said casing, means for collecting and reflecting the light rays emanating from said illuminating means, and a lens positioned in said restricted opening of said casing, said lens operating to collect said reflected light rays and to project the collected rays as intensified light beams through said restricted opening, whereby the intensified light beams are projected on narrow lines and conforming to a letter or symbol.

2. An illuminated apparatus for signal and display embodying a casing provided with a light opening elongated and restricted both longitudinally and transversely of the length of the casing and conforming to a letter or symbol, a series of lamps within said casing, and a lens separate from said lamps and positioned in said light opening of the casing, said lens operating to intensify the light rays emanating from said lamps and to project the light rays on narrow lines and in the form of an intensified light beam conforming to a letter or symbol.

3. An illuminated apparatus for signal and display embodying a casing the components of which are assembled to simulate a letter or symbol, said casing being provided with a light opening elongated and restricted both longitudinally and transversely of the casing and substantially continuous and conforming to the outlines of a letter or symbol, lamps within said casing, a reflector continuous with respect to said lamps and operable for collecting the light rays emanating from said lamps and for reflecting the collected rays through said restricted opening, and lenses positioned in the restricted opening and conforming to the outline of a letter or symbol, said lenses being effective in intensifying the collected light rays and in projecting the same as narrow light beams conforming to the outline of a letter or symbol.

4. An illuminated apparatus for signal and display embodying a casing provided with a light opening elongated and restricted both longitudinally and transversely of the length of the casing and conforming to the outlines of a letter or symbol, a series of lamps housed within said casing rearwardly of said light opening, means for collecting the light rays emanating from said lamps and operable for reflecting the collected rays through said narrow light opening, and a continuous lens separate from said lamps and positioned within said light opening and conforming thereto, said continuous lens being operable for intensifying the reflected light rays and for projecting the intensified rays in the form of narrow light beams conforming in outline to a letter or symbol.

5. An illuminated apparatus for signal and display embodying a casing provided with a light opening elongated and restricted both longitudinally and transversely of the length of the casing and conforming to the outlines of a letter or symbol, a series of lamps within said casing rearwardly of the light opening, means common to the series of lamps for collecting the light rays emanating therefrom and operable for reflecting the light rays through said light opening, and a continuous lens conforming to the outline of the letter or symbol and positioned in the light opening, said lens being effective in intensifying the collected light rays and operable for projecting the intensified light rays in the form of a narrow light beam the outlines of which conform to a letter or symbol.

6. An illuminated apparatus for signal and display embodying a casing provided with a light opening elongated and restricted both longitudinally and transversely of the length of the casing and conforming to a letter or symbol, housings associated with said casing, illuminating means within said housings, means for collecting the light rays and reflecting the same through said narrow light opening, and a continuous lens separate from said housings and positioned in said narrow light opening, said lens operating to blend and intensify the collected light rays and to project the same in the form of relatively narrow light beams conforming to the symbol or letter afforded by the light opening.

7. An illuminated apparatus for signal and display embodying a housing composed of a plurality of members assembled to conform to a letter or symbol, said members being provided with light openings each elongated and restricted both longitudinally and transversely of the length of the casing and which conjointly constitute the outlines of a letter or symbol, a series of lamps within said housing, means for collecting the light rays emanating from said lamps and reflecting the collected rays through said narrow openings, and a lens conforming to the outline of the letter or symbol, said lens being positioned in the light openings and operating to blend the light rays and to intensify and project the same in the form of a narrow light beam conforming to the outline of the letter or symbol.

8. An illuminated apparatus for signal and display embodying a casing provided with a light opening, each elongated and restricted both longitudinally and transversely of the length of the casing and conforming to a letter or symbol, lamps within said casing, a multi-faced reflector common to all the lamps for collecting the light rays emanating from them and for reflecting the same through said narrow light opening, and a lens conforming to the light opening and positioned therein, said lens operating to blend and to intensify the collected light rays and to project the same in the form of a narrow light beam conforming to the contour of a letter or symbol.

9. In an apparatus for signal and display, an illuminated character or symbol provided with a series of lamps, and a passage elongated and restricted both longitudinally and transversely of the length of the casing and with a lens conforming to the contour of said character or symbol, said lens being operable for blending the light rays emanating from said lamps and for projecting the said rays in the form of an intensified narrow beam of light conforming to the contour of said letter or symbol.

10. In an apparatus for signal and display, a casing provided with a light opening elongated and restricted both longitudinally and transversely of the length of the casing and conforming to a letter or symbol, illuminating means within said casing, and a lens conforming to the symbol or character and positioned in the restricted light opening, said lens being effective in blending the light rays emanating from said illuminating means and in projecting the blended light rays in the form of an intensified light beam conforming in outline to the contour of the letter or symbol.

11. In an apparatus for signal and display, a casing the components of which are interiorly illuminated, said casing having a passage elongated and restricted both longitudinally and transversely of the length of the casing and a lens conforming to the contour or outline of a letter or symbol, said lens being effective in blending and concentrating the light rays emanating from the interior illumination and operating to project such blended and concentrated light rays as an intensified beam of light of narrow cross section and conforming to the contour of the letter or symbol.

12. An apparatus for signal and display embodying a casing provided with a light opening elongated and restricted both longitudinally and transversely of the length of the casing and conforming to the outline of a letter or a symbol, lamps within said casing, a reflector for collecting the light rays emanating from said lamps, and a lens conforming to the outline of letter or symbol, said lens being effective in blending the light rays emanating from the lamps and for projecting the same in definite lines in the form of beams possessing the intensity requisite for distant visibility.

13. An apparatus for signal and display embodying a casing having a light opening elongated and restricted both longitudinally and transversely of the length of the casing and conforming to the contour of a letter or symbol, illuminating means therein, and lenses for blending the light rays emanating from said illuminating means and for projecting the same in the form of narrow beams conforming to the outline of the letter or symbol and possessing the intensity requisite for distant visibility.

14. An apparatus for signal and display, a casing embodying a series of elements positioned in diverse relation and optionally brought into cooperative relation to produce a number of different letters or characters each complete in itself, the elements of said casing being of channeled cross section, each element having an opening elongated and restricted both longitudinally and transversely of the length of the casing, and means for illuminating each channeled element, and lenses for blending the light rays emanating from said illuminating means and for projecting the blended rays in the form of a light beam conforming to the outline of the letter or symbol and possessing the intensity requisite for distant visibility.

In testimony whereof I have hereto signed my name this 6th day of October, 1927.

LOUIS O. GLATZNER.